June 8, 1937. E. W. MISHLER 2,083,034
APPARATUS FOR WELDING
Filed Dec. 4, 1930 4 Sheets-Sheet 1
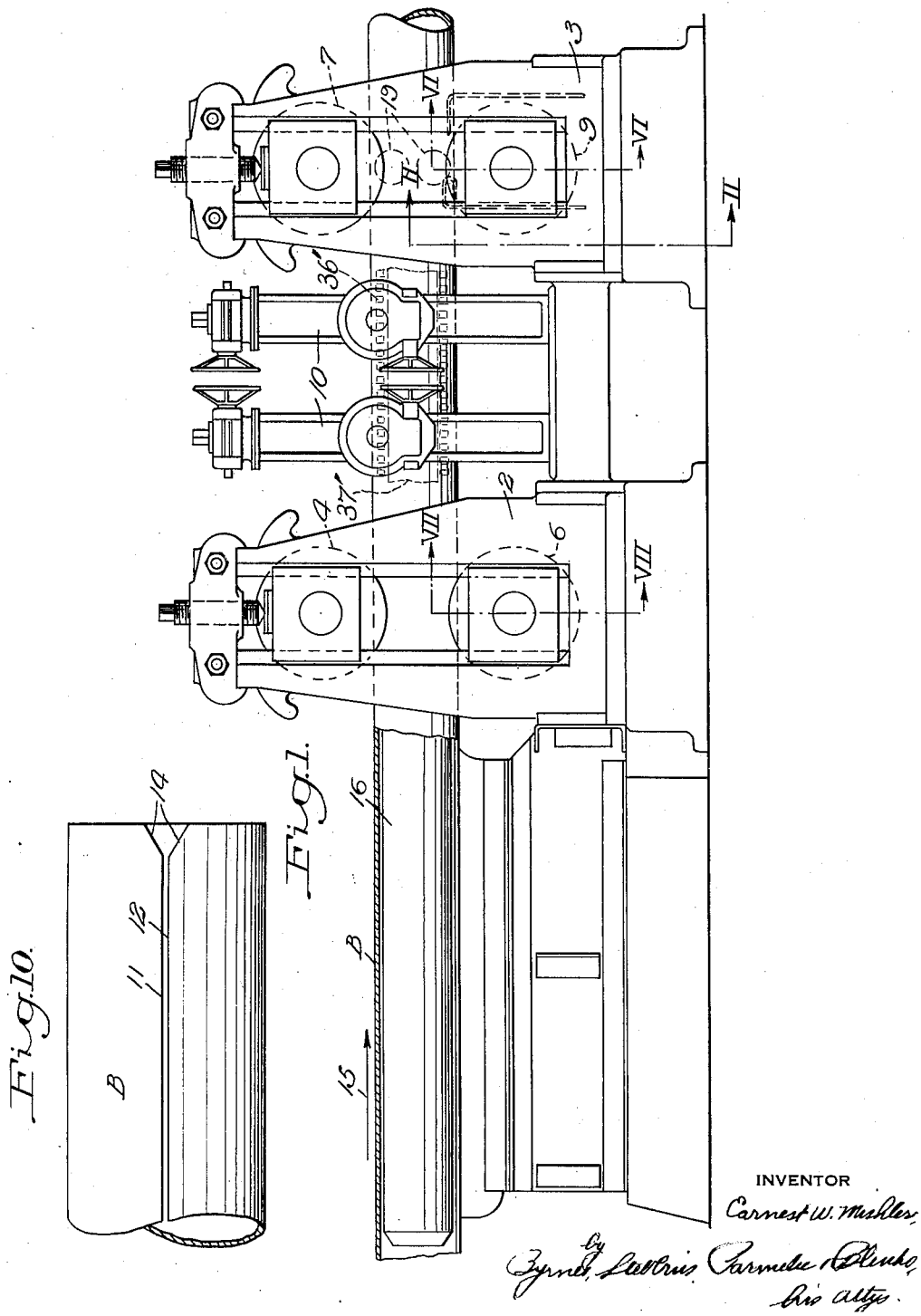
INVENTOR

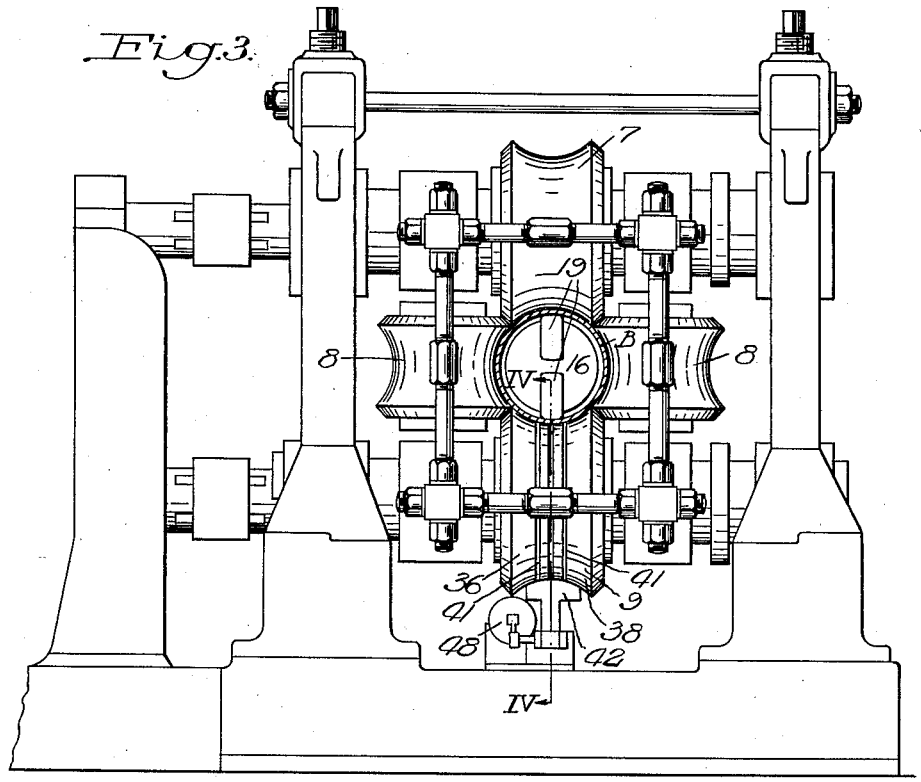
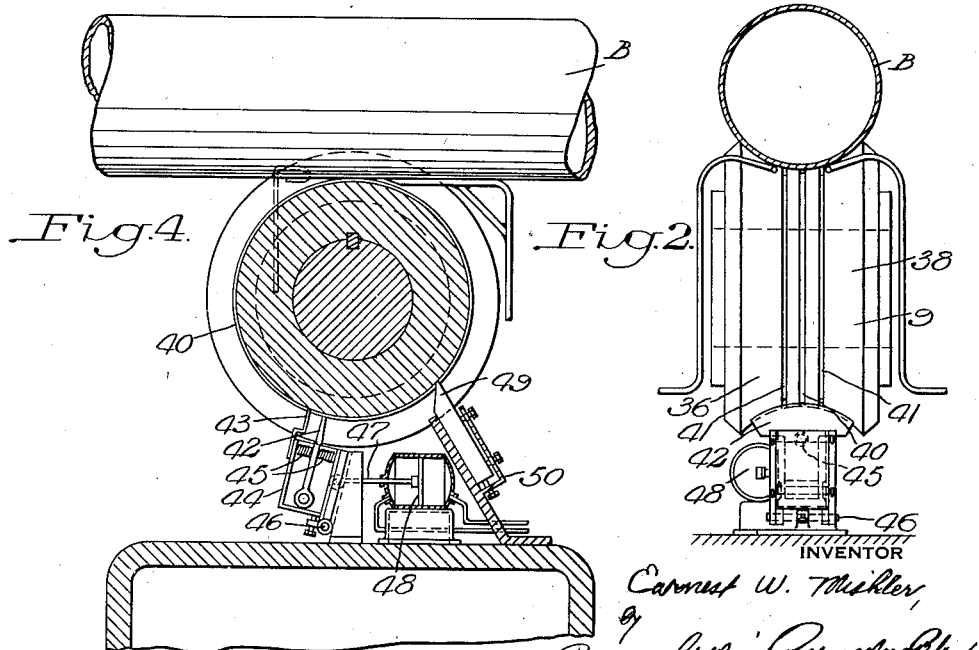

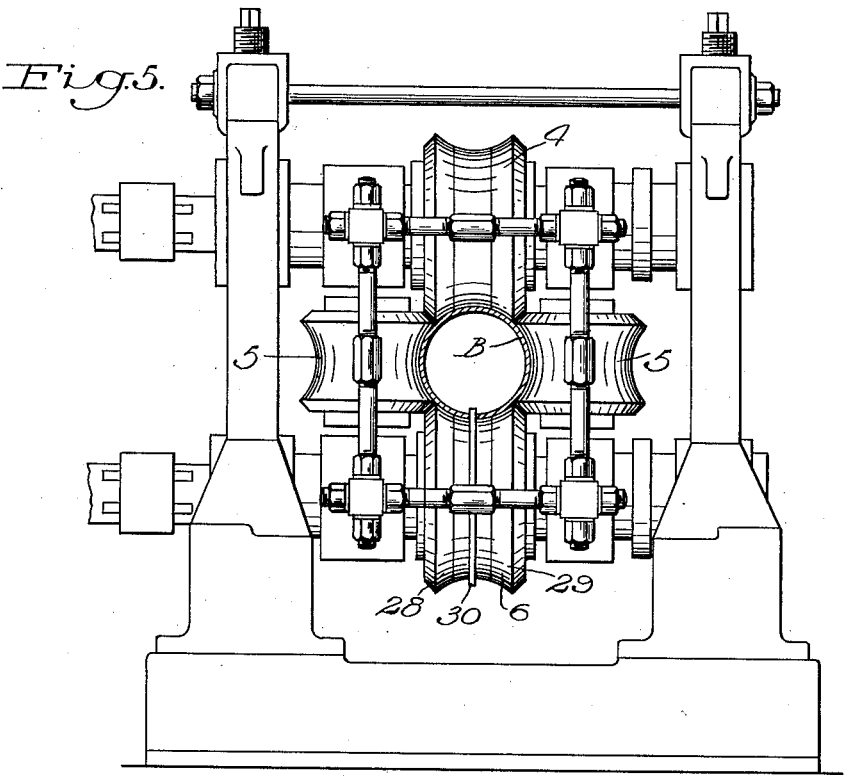
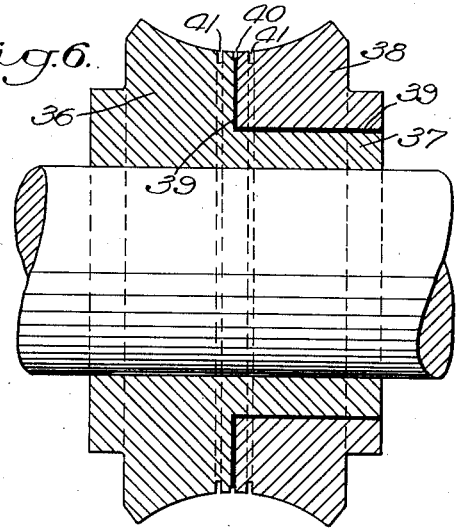

June 8, 1937.  E. W. MISHLER  2,083,034
APPARATUS FOR WELDING
Filed Dec. 4, 1930  4 Sheets-Sheet 4
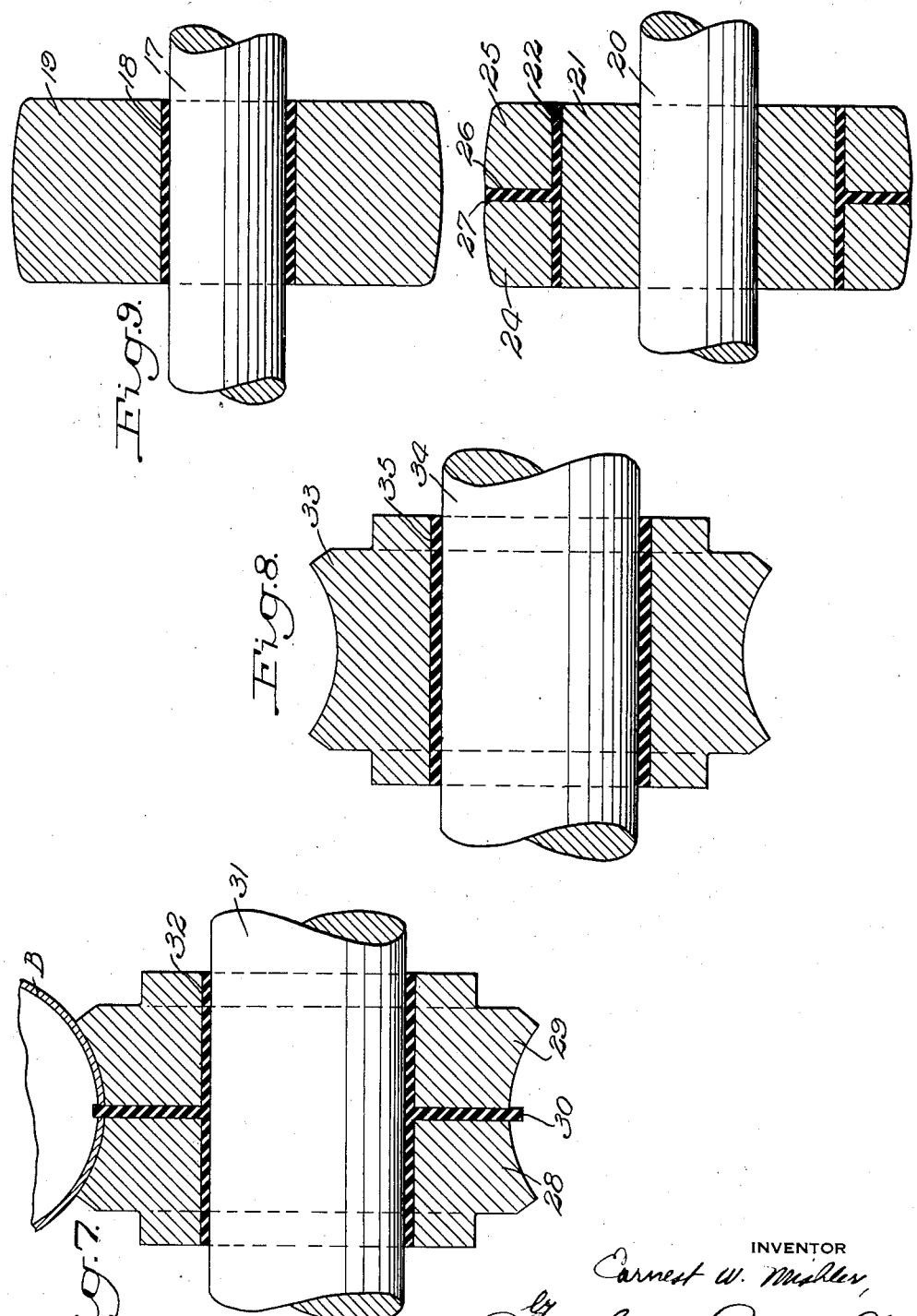
INVENTOR
Earnest W. Mishler,
By Byrnes, Stebbins, Parmelee & Roberts
his Attys.

Patented June 8, 1937

2,083,034

UNITED STATES PATENT OFFICE 2,083,034

APPARATUS FOR WELDING

Earnest W. Mishler, Youngstown, Ohio, assignor to The Youngstown Sheet & Tube Company, Youngstown, Ohio, a corporation of Ohio Application December 4, 1930, Serial No. 499,991

10 Claims. (Cl. 219—6)

The present invention relates broadly to the art of article formation and blanks suitable for the formation of such articles, and more especially to the formation of substantially tubular articles by a welding process and to preformed substantially tubular blanks suitable for use in the production of the finished tubes.

In the production of substantially tubular articles by welding, by which it will be understood that I include pipes, tubes, columns, conduits and the like, regardless of the particular cross sectional characteristics, it is customary in most cases, after the desired electrical heating of the blank, to subject the heated blank to pressure conditions sufficient to complete the weld. Desirable results in this respect are obtained if the construction of the pressure applying means is such as not to interfere with the uniform heating of the blank during the preheating or prewelding zone. Thus if the heating is being accomplished by the induction method, for example, and the pressure applying means is of such nature as to be effective for carrying current from one side of the seam to the opposite side thereof in a path other than the material itself, the heating current will necessarily flow in a decreased quantity across the seam.

It is one of the objects of the present invention to construct an apparatus by means of which such interference with a welding current and consequent non-uniformity of heating is obviated.

It is also customary with many types of welding apparatus, and particularly with induction welders, to subject the material, which is usually in the form of a tubular blank, to a forming and shaping operation in a roll pass, this shaping not only serving the function of closing the blank and imparting the desired contour thereto, but of also accurately sizing the same and bringing the edge portions into such predetermined relationship that the subsequent welding operation is expedited.

It is further desirable that the construction of such closing, shaping or sizing rolls be such as to preclude an electrical short circuit in the material in advance of the actual zone in which it is desired to accomplish the heating. Not only is this true from the standpoint of electrical conservation, and therefore efficiency of the apparatus from the electrical standpoint, but also with respect to the maintenance of the apparatus. Usually where such a short circuiting occurs, there is appreciable sparking due to more or less imperfect contact conditions, which sparking results in burning and pitting of the rolls and bearings. This is in addition to the abrading tendency of the pipe edges, which are more or less sharp, and which in conjunction with sparking tend objectionably to cut the rolls themselves. Another object of the present invention is to provide a construction in which such a short circuiting operation in the sizing or shaping pass is prevented.

Still another object of the present invention is to provide an improved blank suitable for the performance of the subsequent welding operations thereon, and of such characteristics that the welding operation itself is facilitated, and possibility of injury to the apparatus minimized.

In the accompanying drawings I have shown for purposes of illustration only, and in more or less diagrammatic fashion, a preferred embodiment of the present invention. In the drawings:

Figure 1 is a side elevational view of one form of apparatus constructed in accordance with the present invention;

Figure 2 is a detail sectional view, on an enlarged scale, along the line II—II of Figure 1, looking in the direction of the arrows;

Figure 3 is an end elevational view of the right hand end of the apparatus illustrated in Figure 1;

Figure 4 is a detail sectional view, on an enlarged scale, along the line IV—IV of Figure 3, cooking in the direction of the arrows;

Figure 5 is a view similar to Figure 3, viewing the apparatus from the left hand end thereof;

Figure 6 is a detail sectional view, on an enlarged scale, along the line VI—VI of Figure 1, looking in the direction of the arrows;

Figure 7 is a view similar to Figure 6, along the line VII—VII of Figure 1;

Figure 8 is a detail sectional view representative of one of the shaping or welding rolls other than those illustrated in Figures 6 and 7;

Figure 9 is a detail sectional view on an enlarged scale, through the mandrel rolls; and Figure 10 is a detail elevational view of a blank constructed in accordance with the present invention.

In accordance with the present invention there is illustrated in the drawings an apparatus adapted for the induction welding of tubular material such as pipe. This apparatus is herein shown as comprising a roll stand 2, which will hereinafter be referred to as the shaping, closing or sizing stand, and a second stand 3, which will hereinafter be referred to as the welding stand.

As illustrated more particularly in Figure 5 of the drawings, the sizing pass includes an upper roll 4, two side rolls 5 and a bottom roll 6, the bottom roll 6 being illustrated in detail in Figure 7 of the drawings. In like manner the welding stand 3 includes an upper roll 7, two side rolls 8 and a bottom roll 9, this bottom roll being shown in detail in Figures 2 and 6 of the drawings.

Intermediate the stands 2 and 3 are flash regulating stands or control stands 10 constituting no essential part of the present invention but effective, as understood by those skilled in the art, for controlling the characteristic conditions and positioning of the material during its passage from one stand to the other.

The material to be welded is preferably preformed into a blank as illustrated in Figure 10, of substantially the general contour which it is desired to impart to the finished article, and with the edge portions 11 and 12 in closely adjacent but slightly spaced relationship. The leading corners 14 of the blank are cut away or relieved as illustrated in Figure 10, for reasons which will hereinafter be more fully apparent. This blank B is adapted to travel through the apparatus in the direction illustrated by the arrow 15, Figure 1. During its travel it passes over a suitable internal assembly 16, which is generally in the form of a mandrel, but which preferably includes a suitable core and coil construction, illustrated diagrammatically, of the character utilized in induction welding apparatus. Within the welding stand 3 the mandrel carries an upper shaft 17 on which is mounted, through the medium of an insulating sleeve 18, an internal roller 19 adapted to engage the inner surface of the blank substantially in line with the upper roll 7.

Also carried by the mandrel is a lower shaft 20 on which is positioned a second mandrel roll adapted to cooperate with the seam portion, the apparatus herein illustrated being adapted for the production of a bottom seam, although the utility of the invention is not limited to the formation of a seam in any particular location. The bottom mandrel roll includes a hub 21 surrounding which is a sleeve of insulating material 22 carrying mandrel roll sections 24 and 25 insulated from each other through suitable insulation 26. Adjacent the insulation 26, and at the portion of the mandrel roll adapted to overlie the seam, the sections 24 and 25 are provided with cut away portions 27 whereby the mandrel roll sections tend to straddle the seam itself and engage the blank only on opposite sides of the seam.

The blank upon entering the sizing stand is engaged by the rolls therein, the lower roll 6 comprising sections 28 and 29 spaced by a disk 30 of suitable insulating material, and electrically insulated from a supporting shaft 31 by insulating sleeve 32. As the blank travels into the forming pass, it will be apparent that the pressure exerted by the rolls brings the edges 11 and 12 of the blank into engagement with opposite sides of the insulating disk 30, this disk serving to predeterminately space the edge portions and guide the blank, without effecting any short circuiting within this pass. Since the disk 30 itself is of non-conducting material, and the sections 28 and 29 are insulated from their supporting shaft, it will be apparent that the seam is not electrically short circuited in this pass.

The other rolls 4 and 5 of this pass, of which the roll shown in Figure 8 may be considered as representative, are of the same general construction comprising a rim portion 33 carried by a shaft 34 through the medium of a suitable insulating sleeve 35. By reason of this construction, the rolls as an entity, including the shafts and the housing, are prevented from establishing a conducting circuit entirely around the material in such manner as to short circuit the seam.

During its passage through the stand 2, the blank is sized and shaped, and then travels through the regulating or control stands 10 over the mandrel 16. Within this general zone a heating current is induced within the blank sufficient to bring the edges 11 and 12 thereof to a welding temperature. This heating is accomplished through the medium of a coil or coil sections 36' surrounding a suitable core portion 37' of the mandrel 16 as illustrated diagrammatically in Figure 1. If a single coil is utilized, the coil will be most effective when completely enclosed within the material being welded, while if a plurality of interior coil structures are used, each coil structure will become successively effective as the material passes thereover. In this manner it is possible for example, to obtain more efficient heating of the leading and trailing portions of a given piece of material. Such a heating is characterized by inducing the current flow directly within the material itself as contrasted with the more usual method of supplying the current through the medium of contacts or contact rollers suitably insulated one from the other.

Continued travel of the blank, with its edges at welding temperature, brings it into the roll pass defined by the rolls in the welding stand 3. In this pass, which is of generally smaller dimensions than the pass in the sizing stand, the edges are brought into abutting engagement under pressure conditions sufficient to effect welding. The top rolls 7 and the side rolls 8 cooperate with the lower roll 9 to substantially completely enclose the material. In order to preclude the roll 9 from short circuiting or electrically bridging the seam in the material, it is preferably constructed as illustrated in detail in Figure 6. As shown in this figure there is a main section 36 having a hub 37 on which is mounted an auxiliary section 38, the auxiliary section being electrically insulated from the main section by suitable insulation 39. Adjacent the insulation 39 at the peripheral junction point of the sections 36 and 38 there is provided a groove 40 effective for receiving the bead formed by the upsetting or welding pressure. This groove serves to definitely define the bead zone and impart a predetermined contour and shape to the bead. Adjacent the groove 40, and lying on either side thereof is a groove 41 adapted to receive air nozzles or the like by means of which a blast of suitable fluid may be directed through the roll for blowing scale and dirt from the roll and keeping its surface clean.

The rolls 7 and 8, like the rolls 4 and 5, are represented in Figure 8 of the drawings as comprising rim portions carried by their shafts through the medium of insulating sleeves.

From the foregoing it will be apparent that I have provided a welding apparatus in which there may be an electrical heating zone intermediate a sizing zone and a welding zone, and in which the sizing zone and welding zone are of such construction as to preclude an electrical short circuiting operation therein. In this manner, current put into the blank itself, regardless of the manner of input, for the purpose of heating the seam, is precluded from leaving the material as would occur if a short circuit were permitted. In this manner, by providing a blank of uniform characteristics and a current input of constant value, it is possible to insure constant heating to a uniform temperature, and thereby obtain a seam of uniformly welded characteristics.

The mandrel rolls within the welding pass serve to support the material internally and assist in the seam formation, the mandrel roll 21 being of such construction as before described, as to preclude internal short circuiting at the seam.

By constructing a blank as illustrated in Figure 10, the provision of sharp corners with their cutting and holding characteristics are obviated, so that the entry of the material into the apparatus is facilitated. The cut away portions 14 also serve as guiding means cooperating with the disk 30 so as to insure proper cooperation between the disk and the spaced edges 11 and 12. In this manner entry of the blank and guiding of the blank is facilitated, and possibility of short circuiting upon the initial entry of the material is minimized.

In Figures 2 and 4 of the drawings I have illustrated a scraper blade 42 adapted to cooperate with the periphery of the lower roll 9 and assist in cleaning the same. This scraper assembly may also include a scraper blade 43 adapted to project into the bead forming groove 40 for keeping the same clean and insuring a bead of desired characteristics. In the embodiment of the invention illustrated, the scrapers 42 and 43 are carried by a scraper frame 44 and maintained in spaced relationship by coil springs 45. The entire frame has a pivotal mounting 46, and is adapted to be swung from operative to inoperative position through the medium of a connecting rod 47 and fluid motor 48.

For cleaning the side grooves 41, I may also provide scraping tools 49 adjustably mounted in a suitable frame 50 carried by the base of the apparatus.

To those skilled in the art it will be understood that the invention comprises improved welding means by which pitting of the rolls and bearings is prevented, together with means for maintaining clean working surfaces on the rolls which are particularly subjected to extruded metal particles. These rolls, as well as the other rolls utilized for effecting a welding operation, are of such construction as to preclude current loss from the blank itself and thereby improve welding conditions.

While I have herein illustrated and described a preferred embodiment of the present invention, it will be understood that changes in the construction, arrangement and operation of the parts may be made without departing either from the spirit of the invention or the scope of my broader claims.

I claim:

1. Apparatus for welding together the edges of a longitudinal seam cleft in a formed tube blank comprising blank feeding means, means for progressively inducing welding current flowing circumferentially of the blank and across the cleft, said feeding means including a roll having separate insulated portions engaging opposite edges of the blank and an insulated fin entering the cleft therebetween, to prevent shunting of the induced welding current.

2. Apparatus for welding together the edges of a longitudinal seam cleft in a formed tube blank comprising blank feeding means, means for progressively inducing welding current flowing circumferentially of the blank and across the cleft, said feeding means including a roll having separate insulated portions engaging opposite edges of the blank to prevent shunting of the induced welding current.

3. Apparatus for welding together the edges of a longitudinal seam cleft in a formed tube blank comprising blank feeding means, means for progressively inducing welding current flowing circumferentially of the blank and across the cleft, said feeding means including a roll having separate insulated portions engaging opposite edges of the blank to prevent shunting of the induced welding current, and a second roll having an insulating mounting, for engaging the blank at points spaced from said edges.

4. Apparatus for welding together the edges of a longitudinal seam cleft in a formed tube blank comprising blank feeding means, means for progressively inducing welding current flowing circumferentially of the blank and across the cleft, said feeding means including a roll having separate insulated portions engaging opposite edges of the blank to prevent shunting of the induced welding current, and a second roll having an insulating mounting, for engaging the blank at points spaced from said edges, said rolls being journaled in a common roll stand and effective to size the blank.

5. Apparatus for welding together the edges of a longitudinal seam cleft in a formed tube blank comprising blank feeding means, means for progressively inducing welding current flowing circumferentially of the blank and across the cleft, and a welding roll stand including a roll having separate insulated portions engaging the tube on opposite sides of the welded seam formed by joining the blank edges.

6. Apparatus for welding together the edges of a longitudinal seam cleft in a formed tube blank comprising blank feeding means, means for progressively inducing welding current flowing circumferentially of the blank and across the cleft, a welding roll stand including a roll having separate insulated portions engaging the tube on opposite sides of the welded seam formed by joining the blank edges, and a second roll having an insulating mounting, for engaging the blank at points spaced from said edges.

7. Apparatus for welding together the edges of a longitudinal seam cleft in a formed tube blank comprising blank feeding means, means for progressively inducing welding current flowing circumferentially of the blank and across the cleft, and a welding roll stand including a mandrel adapted to be embraced by the blank as it is being welded, and a roll on said mandrel having separate insulated portions engaging the interior of the tube on opposite sides of the welded seam formed by joining the blank edges.

8. Apparatus for welding together the edges of a longitudinal seam cleft in a formed tube blank comprising blank feeding means, means for progressively inducing welding current flowing circumferentially of the blank and across the cleft, and a welding roll stand including a mandrel adapted to be embraced by the blank as it is being welded, and a roll on said mandrel having an insulating mounting and adapted to engage the interior of the tube.

9. Apparatus for welding together the edges of a longitudinal seam cleft in a formed tube blank comprising blank feeding means, means for progressively inducing welding current flowing circumferentially of the blank and across the cleft, a welding roll stand including a mandrel adapted to be embraced by the blank as it is being welded, a roll on said mandrel having separate insulated portions engaging the interior of the tube on opposite sides of the welded seam formed by joining the blank edges, and a second roll journaled on but insulated from said mandrel adapted to engage the interior of the tube apart from the seam.

10. In a welding apparatus, a roll pass including a seam shaping roll comprising a plurality of sections, said sections being shaped to provide a fluid passageway in the periphery thereof, and means for delivering a fluid jet through said passageway.

EARNEST W. MISHLER.